United States Patent [19]

Mello

[11] Patent Number: 4,504,824

[45] Date of Patent: Mar. 12, 1985

[54] TOOL DETECTION SYSTEM

[75] Inventor: William R. Mello, Huntington Beach, Calif.

[73] Assignee: Houdaille Industries, Inc., Ft. Lauderdale, Fla.

[21] Appl. No.: 442,357

[22] Filed: Nov. 17, 1982

[51] Int. Cl.³ .............................................. B23B 49/00
[52] U.S. Cl. ........................................ 340/680; 408/6; 408/16
[58] Field of Search ..................... 340/680, 687; 408/6, 408/8, 16, 116

[56] References Cited

U.S. PATENT DOCUMENTS

| Re. 26,623 | 7/1969 | Erikson . | |
|---|---|---|---|
| 1,498,477 | 6/1924 | Nichles . | |
| 3,587,361 | 6/1971 | Smith | 408/16 |
| 3,817,246 | 6/1974 | Weigl | 128/145.8 |
| 4,069,587 | 1/1978 | Peralta | 32/22 |
| 4,127,279 | 11/1978 | Wright | 279/1 TS |
| 4,426,177 | 1/1984 | Perry | 408/8 |

Primary Examiner—Jerry W. Myracle
Attorney, Agent, or Firm—Hill, Van Santen, Steadman & Simpson

[57] ABSTRACT

Apparatus for detecting the presence of a tool in a spindle which can be used where automatic unattend operation occurs and it must be known that a tool is in the spindle. For example, if the tool changer on a machining center dropped a tool when transferring it from a magazine to a spindle the machine would continue to operate but machining would not occur. In the invention, air pressure is supplied to a point through a series of holes in the spindle and if a tool is present in the spindle, it will prevent air from escaping. If the tool is absent, air will escape from the spindle or when the tool is not properly seated in the taper of the spindle which will cause the air pressure to drop and to stop the spindle motor and/or provide a suitable indication and warning to the operator.

5 Claims, 2 Drawing Figures

TOOL DETECTION SYSTEM

BACKGROUND OF THE INVENTION

1. Field of the Invention

This invention relates in general to a tool detection system and in particular to a novel warning and indicating system which detects when a tool is not present in a spindle.

2. Description of the Prior Art

Automatic machine tools have become in common use wherein a number of different tools are utilized to provide sequential machining operations. In some such machines, tool holders are used in which the tools are automatically changed and for proper operation it is necessary that a tool be present in the tool holder for proper operation, otherwise machining will not occur.

SUMMARY OF THE INVENTION

It is an object of the present invention to provide a tool detecting apparatus to detect whether or not a tool is present in a spindle and the invention can be used in applications which include automatic unattended operation wherein for reliable operation it must be know that a tool is in the spindle. For example, if the tool changer on a machining center dropped a tool in transferring the tool from a magazine to the spindle, the machine would continue in operation but machining would not take place. The present invention uses a pneumatic system to detect the presence or absence of a tool and either stops the motor driving the machine and/or provides an indication and warning to an operator so that he can take the necessary corrective steps to assure that the machine operates properly.

A spindle assembly rotates on suitable bearings and has a tapered opening into which the tool is received. The tool is inserted and held in the spindle and air pressure is supplied to the tapered tool surface through a series of holes in the spindle which mate with a groove in the stationary portion of the spindle holder. Air pressure is supplied to the groove and through the openings to the spindle and these openings are sealed by the tapered tool shank when the tool is properly seated in the spindle. If the tool is not properly seated in the spindle, air will escape through the openings thus causing the air pressure in the groove and a supply line to drop which will operate a pressure sensitive switch to indicate the low pressure condition. The low pressure sensing switch may control the drive motor for the spindle and the tool so as to prevent the spindle from turning and/or indicators which may be visual or audible can be energized so as to provide suitable warning to the operator that a tool is not the spindle.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
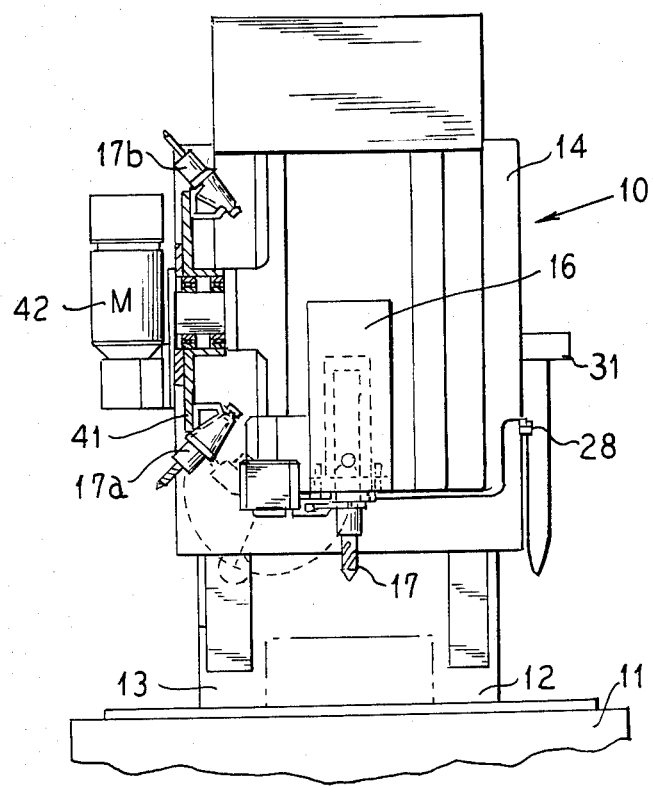
FIG. 1 is a front plan view of an automatic drilling machine.

FIG. 1 illustrates an automatic drilling machine 10 which is mounted on a base 11 and has supports 12 and 13 for supporting the machine 14. The machine 14 has a drilling tool 17 for machining a suitable workpiece. The tool 17 can be periodically changed as disclosed in U.S. Pat. No. 3,999,664 wherein a turntable 41 comprises a magazine and carries a number of other tools 17a and 17b which can be automatically placed in the spindle and which can be driven by the motor 42.

Figure 2:
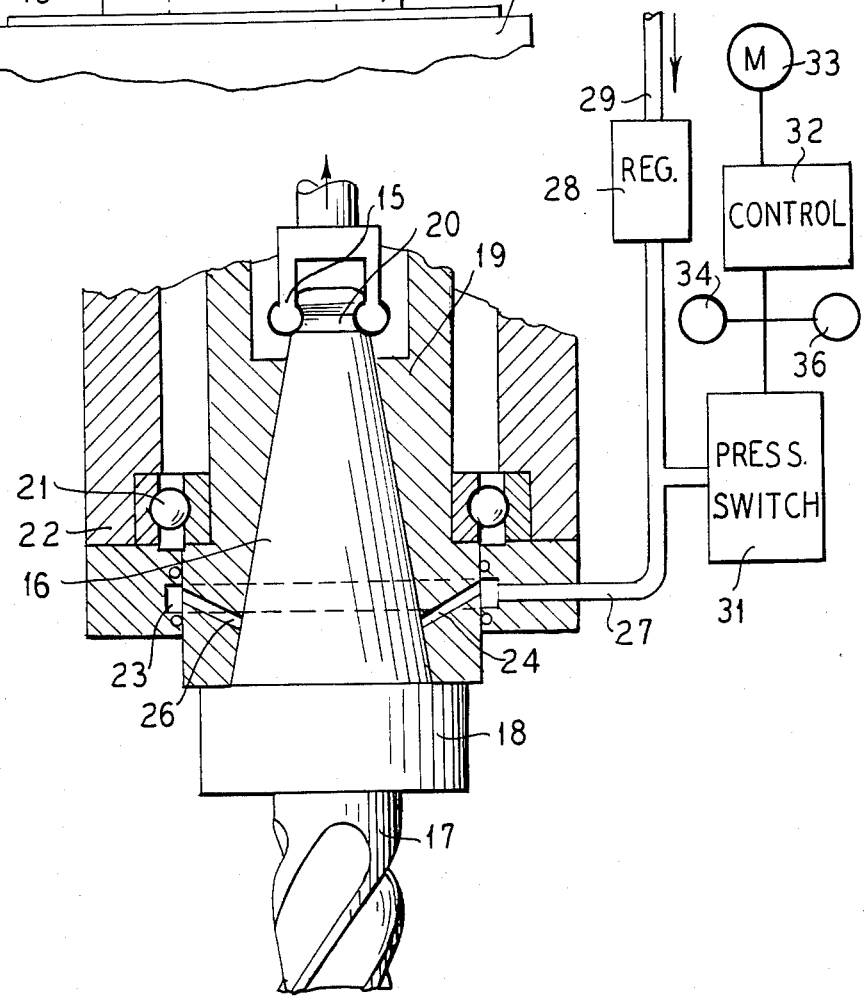
FIG. 2 is a sectional view through the spindle of the drilling machine illustrating the invention.

FIG. 2 comprises a partially broken away sectional view through the rotating spindle 19 which is formed with a tapered opening into which a mating tapered portion 16 of the tool 17 is received. The tool 17 also has a collar 18 which abuts against the end of the spindle. Tapered tool supporting fingers 15 are received in a groove 20 formed in the tapered portion 16 of the tool and holds the tool 17 in the spindle 19. A stationary portion 22 of the spindle holder supports the spindle 19 with suitable bearings 21 as illustrated. A groove 23 is formed in the stationary portion 22 and communicates with a number of passageways 24 formed through the rotating spindle 19 so as to apply air pressure from the stationary portion 22 to the inside tapered surface of the spindle 19. Thus, when a tool 17 is properly mounted in the spindle 19, the tapered portion 16 will close off the ends of the passageways 24 and air pressure cannot escape from the ends of the tubes or openings 24 because the tool shank 16 seals such openings. An air pressure conduit 27 is connected to a suitable regulator 28 which receives air pressure on a supply line 29 from a suitable air pressure source. A pressure switch 31 is mounted in line 27 and is actuated when the pressure in the line 27 falls below a predetermined pressure which indicates that a tool 17 is either not present in the spindle 19 or either is not properly seated in the spindle 19.

The pressure switch 31 is connected to a suitable control 32 which can turn off the driving motor 33 for the spindle 19 so that the spindle does not operate. Indicator 34 and also warning device 36 may also be connected to the pressure switch 31 so as to visually and/or audibly indicate that a tool is not present in the spindle 19.

When the motor 33 is stopped by the system of the invention or an indication is given by the indicator 34 and the warning device 36 the operator knows that a tool is not present in the spindle 19 and he will correct such situation by replacing the tool so as to seal the openings 24 thus causing the pressure to rise so the pressure switch 31 is de-energized and the motor 33 can operate to drive the tool 17.

Although the invention has been described to operate with air pressure greater than atmospheric pressure applied to the line 27, it is to be realized that the system will also work if pressure less than atmospheric is applied to line 27. In this case, the switch 31 would close if pressure rises due to a leak when a tool is not seated in the spindle.

It is seen that this invention provides a novel and simple monitoring device which prevents an automatic machine from operating when a tool is not present and provides suitable warning and indication so that the operator could correct this situation.

Although the invention has been described with respect to preferred embodiments, it is not to be so limited as changes and modifications may be made therein which are within the full intended scope of the invention as defined by the appended claims.

I claim as my invention:

1. Means for detecting the presence of a tool in a spindle comprising, a stationary spindle holder formed with a groove, a rotatable spindle supported by said spindle holder and formed with at least one passageway which mates with said groove, said spindle formed with a tapered opening and said passageway terminating in said tapered opening, a tool with a tapered tool shank receivable in said tapered opening of said spindle so as to seal the end of said passageway, a pressure conduit connected to said spindle holder to provide a suitable pressure in said groove when a tool is seated in the spindle, and a pressure responsive means connected to said pressure conduit and actuated when a tool is not seated in said spindle.

2. Means for detecting the presence of a tool in a spindle according to claim 1 including a drive means connected to said spindle and said pressure responsive means connected to said drive means to deactuate it when a tool is not seated in said spindle.

3. Means for detecting the presence of a tool in a spindle according to claim 1 including a warning device connected to said pressure responsive means.

4. Means for detecting the presence of a tool in a spindle according to claim 3 wherein said warning device produces an audible output.

5. Means for detecting the presence of a tool in a spindle according to claim 3 wherein said warning device produces a visual output.

* * * * *